(12) United States Patent
Nicolov

(10) Patent No.: US 10,711,443 B2
(45) Date of Patent: Jul. 14, 2020

(54) ORGANIC WASTE SEPARATOR FOR UNDER A SINK

(71) Applicant: ANVY TECHNOLOGIES INC., Victoria (CA)

(72) Inventor: Victor Nicolov, Victoria (CA)

(73) Assignee: Anvy Technologies Inc. (CA)

( * ) Notice: Subject to any disclaimer, the term of this patent is extended or adjusted under 35 U.S.C. 154(b) by 0 days.

(21) Appl. No.: 16/245,103

(22) Filed: Jan. 10, 2019

(65) Prior Publication Data

US 2020/0018053 A1  Jan. 16, 2020

(51) Int. Cl.
| | |
|---|---|
| *E03C 1/266* | (2006.01) |
| *B01D 21/26* | (2006.01) |
| *B02C 23/08* | (2006.01) |
| *F16L 37/00* | (2006.01) |

(52) U.S. Cl.
CPC .......... *E03C 1/2665* (2013.01); *B01D 21/262* (2013.01); *B02C 23/08* (2013.01); *B02C 2201/06* (2013.01); *F16L 37/004* (2013.01)

(58) Field of Classification Search
CPC ..... B02C 23/08; B02C 23/10; B02C 18/0092; B02C 2201/06; B02C 2201/063; E03C 1/2665; E03C 1/266; F16L 37/044
See application file for complete search history.

(56) References Cited

U.S. PATENT DOCUMENTS

| | | | |
|---|---|---|---|
| 7,240,865 B2 * | 7/2007 | Choi | A61L 11/00 241/100 |
| 7,954,739 B2 | 6/2011 | Shin-Ya | |
| 8,464,970 B2 * | 6/2013 | Ceru | E03C 1/2665 241/100 |
| 9,694,362 B2 | 7/2017 | Lang | |
| 2015/0048021 A1 * | 2/2015 | Bates | E03C 1/2665 210/435 |

FOREIGN PATENT DOCUMENTS

| | | | | |
|---|---|---|---|---|
| KR | 20030045715 A | * | 6/2003 | .......... E03C 1/2665 |
| WO | WO-2019099971 A1 | * | 5/2019 | ............... E03C 1/26 |

* cited by examiner

*Primary Examiner* — Terry K Cecil
(74) *Attorney, Agent, or Firm* — Baumgartner Patent Law; Marc Baumgartner

(57) ABSTRACT

A waste separator for attachment to a sink drain pipe is provided, the waste separator comprising: a transverse pipe, the transverse pipe including a proximal end, a distal end, a sidewall therebetween, a solid waste outlet at the distal end and a magnetic flange on the sidewall, the transverse pipe defining a transverse bore, the transverse bore housing a motor-driven auger and a cylindrical filter between the motor-driven auger and the transverse pipe sidewall; a sink wastewater inlet in a vicinity of the proximal end, the sink wastewater inlet normal to the transverse bore and in fluid communication with the transverse bore; a normally-closed solenoid valve, the normally-closed solenoid valve in a vicinity of the distal end of the transverse pipe; a lower vessel, the lower vessel including a waste water outlet, the lower vessel defining an interior, the interior in fluid communication with the transverse bore proximate the proximal end; and a microprocessor, the microprocessor in electronic communication with the normally-closed solenoid valve.

12 Claims, 7 Drawing Sheets

ORGANIC WASTE SEPARATOR FOR UNDER A SINK

CROSS REFERENCE TO RELATED APPLICATIONS

The present invention claims the benefit of Canadian Patent Application Serial No. 3011856, filed on Jul. 16, 2018, entitled ORGANIC WASTE SEPARATOR FOR UNDER A SINK, which is hereby incorporated in its entirety including all tables, figures, and claims.

FIELD

The present technology is a home appliance for separating wastewater into solid waste and liquid waste. More specifically, it is an in-line, microprocessor controlled, organic waste separator for a sink drain pipe.

BACKGROUND

Over the years, the treatment of kitchen waste has changed. Garburators were considered to be an acceptable method of disposing with solid waste. These appliances use a lot of water, and add an unnecessary load to sewage systems. Further, they dispose of materials that could be used as compost or for anaerobic digestion. More current approaches focus on saving the solid waste. For example, U.S. Pat. No. 9,694,362 discloses a composting garbage disposal for under sink use in a kitchen which separates food waste items into liquid and solid components. The liquid components are directed to a standard sewer or septic system. The solid components are directed to a removable storage bin. The food waste items are separated by use of a motor driven auger member which is in close proximity to the inside wall of a screened cup so that the liquid exits the screened portion of the cup and the solid exits through an aperture in the floor of the cup. A microprocessor circuit senses the strain on the drive motor and if the strain becomes excessive, automatically reverses the direction of the shaft and auger thereby releasing excess food waste that is causing the excess strain. The solid waste is retained in an open storage bin, so odours are not contained. Further, vermin would be attracted to the waste because of the odours. Still further, if not emptied regularly, the solid waste could be contaminated with mold and other fungus, leading to the release of fungal spores into the ambient environment. It is not a closed system. The placement and design of the exit tube for the solid waste would be problematic as the auger would direct the solid waste down into the bottom of the cup resulting in plugging of the opening to the exit tube, which is of a much smaller diameter than is the bottom of the cup. The placement of the exit tube and the liquid waste tube is problematic as the liquid would preferentially exit through the exit tube for the solid waste.

U.S. Pat. No. 8,464,970 discloses an under-sink waste processing appliance which includes a waste separator which extracts liquid from organic waste and passes such extracted liquid to a residential drain line. The remaining solid, in the form of organic pulp, is dried in a dryer and deposited in a removable collection receptacle. The cutter, which may be an auger, cuts the organic waste before drying it. The cutter is transversely mounted in the waste separator. The pulp outlet and the liquid outlet are at opposite sides of the waste separator, hence the motive force of the cutter pushes the organic pulp to the pulp outlet, but there is no force to direct the liquid to the liquid outlet, hence the separation of the liquid from the solid would be very poor. Thus, this is a very inefficient system. No measures have been taken to seal the system from the ambient, hence odours could be released. Drying uses a lot of energy, and causes odours to be released. Further, the resultant dried waste must be rehydrated to be used as compost.

U.S. Pat. No. 7,954,739 discloses a garbage disposal apparatus includes a shredding device for shredding garbage put in through a drain opening of a sink and a connecting member, a transverse conveying device for conveying the garbage shredded by the shredding device in a transverse direction, a dehydrating device into which the shredded garbage conveyed through the transverse conveying device is introduced and that is for dehydrating the shredded garbage while conveying the shredded garbage upward, a drying device into which the shredded garbage discharged through the dehydrating device is supplied via a chute and that is for drying the shredded garbage while rotating, and a garbage receptacle disposed under the drying device so as to be able to be pulled out, and the shredded garbage dried and reduced in volume by the drying device drops from the rotating drying device and is collected in the garbage receptacle. Drying uses a lot of energy and causes odours to be released. Further, the resultant dried waste must be rehydrated to be used as compost. It is not a closed system, as it includes an exhaust fan and a removable receptacle, which appears to have no mechanism to isolate it from the ambient.

What is needed is a safe, easy to use waste separator for under sinks that reduces or eliminates odour release. It would be preferable if it was compact and allowed for a larger bin to be used. It would be more preferable if it was energy efficient. It would be still more preferable if it had few moving parts. It would be preferable if it reduces or eliminated accidental water escape. It would be also preferable if it was under control of a microprocessor. It would be preferable if it was a closed system when the sink plug was in place.

SUMMARY

The present technology is a safe, easy to use waste separator for under sinks that reduces or eliminates odour release. It is compact, energy efficient and has few moving parts. It reduces or eliminates accidental water escape. It is under control of a microprocessor. The waste separator allows for a larger bin to be used. It is a closed system when the sink plug is in place and is only open at the sink when the plug is not in place. The system has a low power requirements as it does not cut the solid waste, nor does it dry the solid waste.

In one embodiment, a waste separator for attachment to a sink drain pipe is provided, the waste separator comprising: a transverse pipe, the transverse pipe including a proximal end, a distal end, a sidewall therebetween, a solid waste outlet at the distal end and a magnetic flange on the sidewall, the transverse pipe defining a transverse bore, the transverse bore housing a motor-driven, non-cutting urging mechanism and a cylindrical filter between the motor-driven, non-cutting urging mechanism and the transverse pipe sidewall; a sink wastewater inlet in a vicinity of the proximal end, the sink wastewater inlet normal to the transverse bore and in fluid communication with the transverse bore; a normally-closed solenoid valve, the normally-closed solenoid valve in a vicinity of the distal end of the transverse pipe; a lower vessel, the lower vessel including a waste water outlet, the lower vessel defining an interior, the interior in fluid communication with the transverse bore proximate the proximal end; and a microprocessor, the microprocessor in electronic communication with the normally-closed solenoid valve.

The waste separator may further comprise an upper pipe, the upper pipe disposed between the sink wastewater inlet and the transverse pipe, the upper pipe defining an upper bore, the upper bore in fluid communication with the sink wastewater inlet and the transverse bore.

In the waste separator the upper pipe may include a dishwasher waste inlet.

In the waste separator, the lower vessel may be a lower pipe and the interior is a lower bore, the lower bore vertically aligned with the upper bore to provide a flow-through bore.

The waste separator may further comprise a solenoid latch set on the normally-closed solenoid flap valve and the distal end, the solenoid latch set in electronic communication with the microprocessor.

The waste separator may further comprise a gasket between the distal end and the normally-closed solenoid valve.

The waste separator may further comprise a motor, the motor attached to the proximal end of the transverse pipe and driving the non-cutting urging mechanism to provide the motor-driven, non-cutting urging mechanisms.

In the waste separator, the non-cutting urging mechanism is a non-cutting auger.

In the waste separator, the non-cutting urging mechanism is a piston.

In another embodiment, a waste separator and collector system for use under a sink is provided, the waste separator comprising: a transverse pipe, the transverse pipe including a proximal end, a distal end, a sidewall therebetween, a solid waste outlet at the distal end and a magnetic flange on the sidewall, the transverse pipe defining a transverse bore, the transverse bore housing a non-cutting motor-driven urging mechanism and a cylindrical filter between the non-cutting, motor-driven urging mechanism and the transverse pipe sidewall; a sink wastewater inlet in a vicinity of the proximal end, the sink wastewater inlet normal to the transverse bore and in fluid communication with the transverse bore; a normally-closed solenoid valve, the normally-closed solenoid valve in a vicinity of the distal end of the transverse pipe; a lower vessel, the lower vessel including a waste water outlet, the lower vessel defining an interior, the interior in fluid communication with the transverse bore proximate the proximal end; and a microprocessor, the microprocessor in electronic communication with the normally-closed solenoid valve, and the collector comprising: a front; a back; the back defining an aperture; a movable seal which covers the aperture; sides; a top, the top including a lid; and a bottom, to define an interior, at least the distal end of the transverse pipe extending into the interior through the aperture such that the magnetic flange abuts the back of the collector and magnetically, releasably seals the transverse pipe to the back.

In the system, the waste separator may further comprise an upper pipe, the upper pipe disposed between the sink wastewater inlet and the transverse pipe, the upper pipe defining an upper bore, the upper bore in fluid communication with the sink wastewater inlet and the transverse bore.

In the system, the movable seal may be a pair of flaps that cover the aperture.

The system may include an alarm and the collector may include a sensor which senses when the collector is full, the alarm and the sensor in electronic communication with the microprocessor.

In the system, the waste separator may further comprise a solenoid latch set on the normally-closed solenoid valve and the distal end, the solenoid latch set in electronic communication with the microprocessor.

In the system, the waste separator may further comprise a gasket between the distal end and the normally-closed solenoid flap valve.

In the system, the non-cutting motor-driven urging mechanism may be a non-cutting, motor-driven auger.

In the system, the non-cutting motor-driven urging mechanism may be a piston.

The system may further comprise a Bluetooth® transceiver in electronic communication with the microprocessor.

The system may further comprise a computing device, the computing device in radio communication with the Bluetooth transceiver.

The system may further comprise an application on the computing device and a weigh scale in the collector, the weigh scale in electronic communication with the Bluetooth transceiver, the application for tracking a weight of organic waste.

In the system, the computing device may be a handheld, mobile device.

In another embodiment, a method of separating organic, solid waste in waste water from liquid waste and collecting the organic solid waste using a system plumbed into a drain pipe for a sink is provided, the system including a bin, a waste separator which is releasably, magnetically connected to the bin at a connection, the connection isolating the bin and the waste separator from the ambient, the waste separator including a solid waste outlet, the solid waste outlet including a normally-closed solenoid valve, the method comprising: a user actuating the waste separator as waste water flows into the system; the system opening the normally-closed solenoid valve; the waste separator urging the organic solid waste into the bin; and the liquid waste exiting the system into the drain pipe.

The method may further comprise the user inactivating the waste separator and the system closing the normally-closed solenoid valve.

The method may further comprise the system reporting a full bin.

FIGURES

FIG. 8C is a schematic of the Bluetooth radio in further communication with an application on a mobile device.

DESCRIPTION

Figure 1:
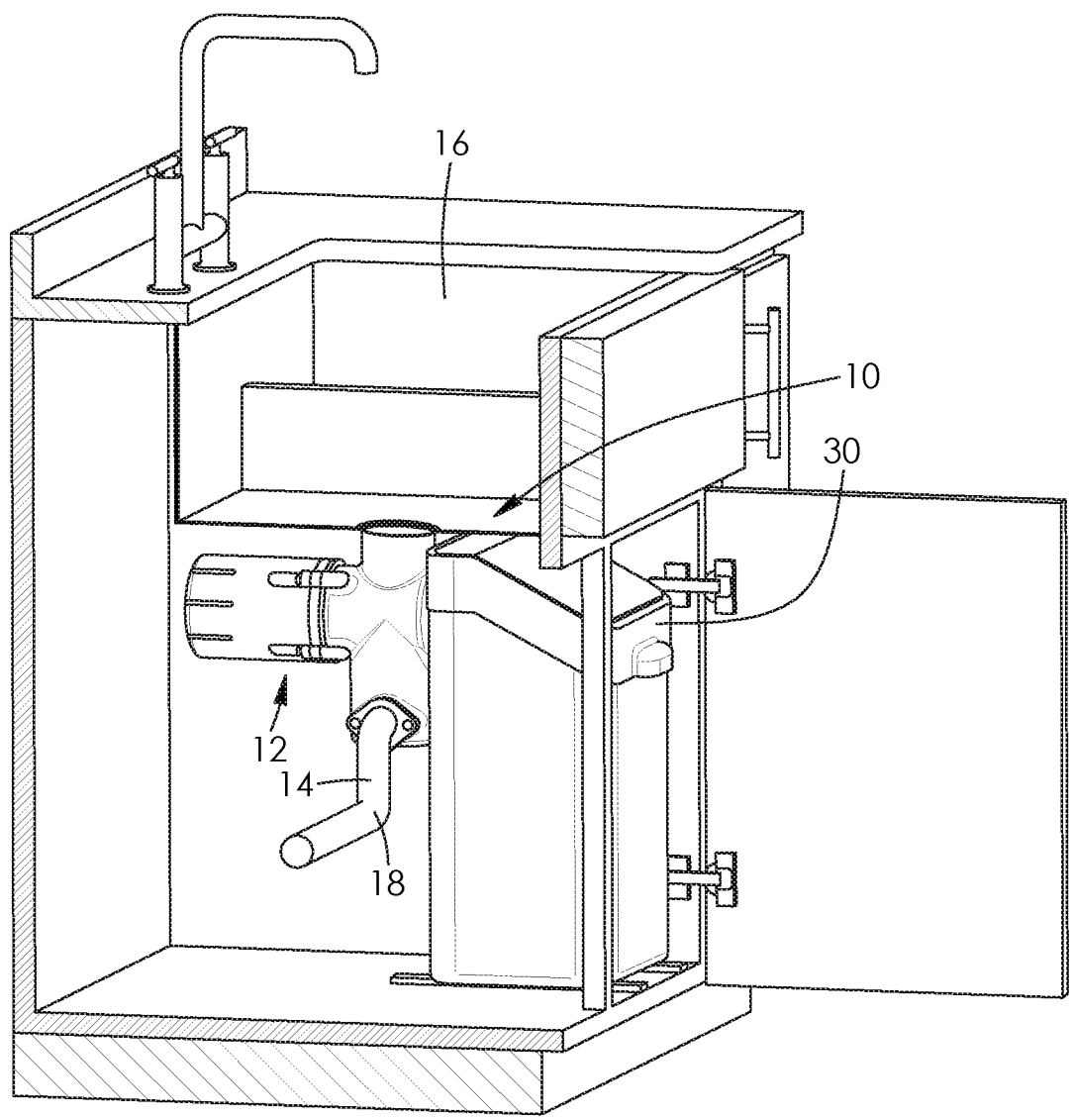
FIG. 1 is a schematic of the waste separator and collection system of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

DEFINITIONS

Computing device—in the context of the present technology, a computing device is a cellular phone, a tablet, a laptop, desktop or purpose-built computing device. It has a memory and a processor.

Handheld, mobile device—in the context of the present technology, a handheld, mobile device is a cell phone, a tablet or a laptop.

Dishwasher wastewater—in the context of the present technology, dishwasher wastewater is a mixture of liquid waste and organic solids that is pumped out of the dishwasher and into the drain.

Sink wastewater—in the context of the present technology, sink wastewater is a mixture of liquid waste and organic solids that is released from the sink into the drain.

Filtered wastewater—in the context of the present technology, filtered wastewater is water that has passed through the filter in the waste separator and has a significantly reduced solid organic waste content.

Non-cutting urging mechanism—in the context of the present technology, a non-cutting urging mechanism includes a non-cutting auger and a piston.

DETAILED DESCRIPTION

Figure 2:
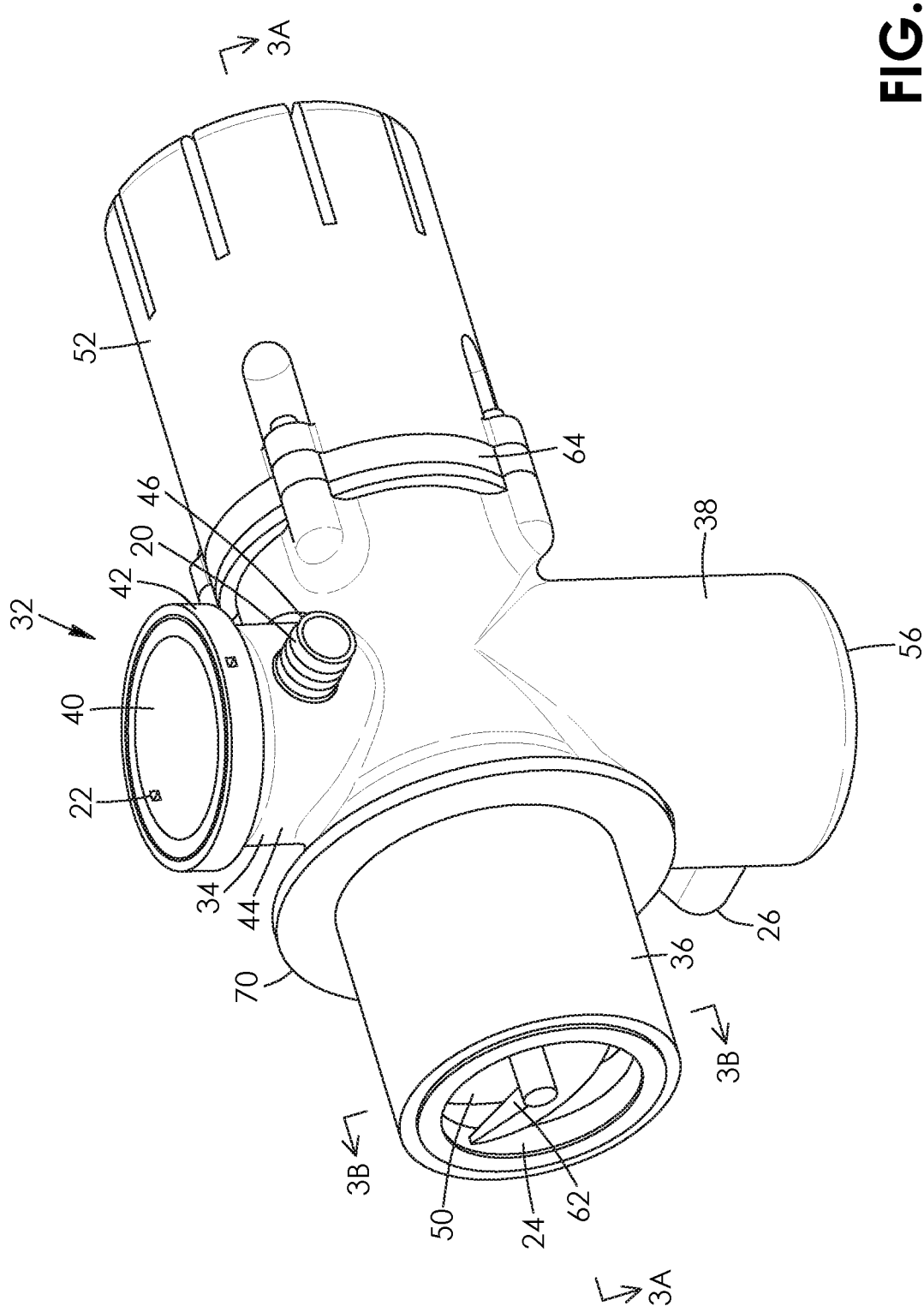
FIG. 2 is a schematic of the waste separator of the system of FIG. 1.

A waste separator and collector system, generally referred to as 10 is shown in FIG. 1. A waste separator, generally referred to as 12, is placed in-line on the drain pipe 14, between the sink 16 and the trap 18. As shown in FIG. 2, it has two inlets for waste, a dishwasher wastewater inlet 20 and a sink wastewater inlet 22 and two outlets, a solid waste outlet 24 and a filtered water outlet 26. Returning to FIG. 1, the collector is a closed bin 30.

Figure 3A:
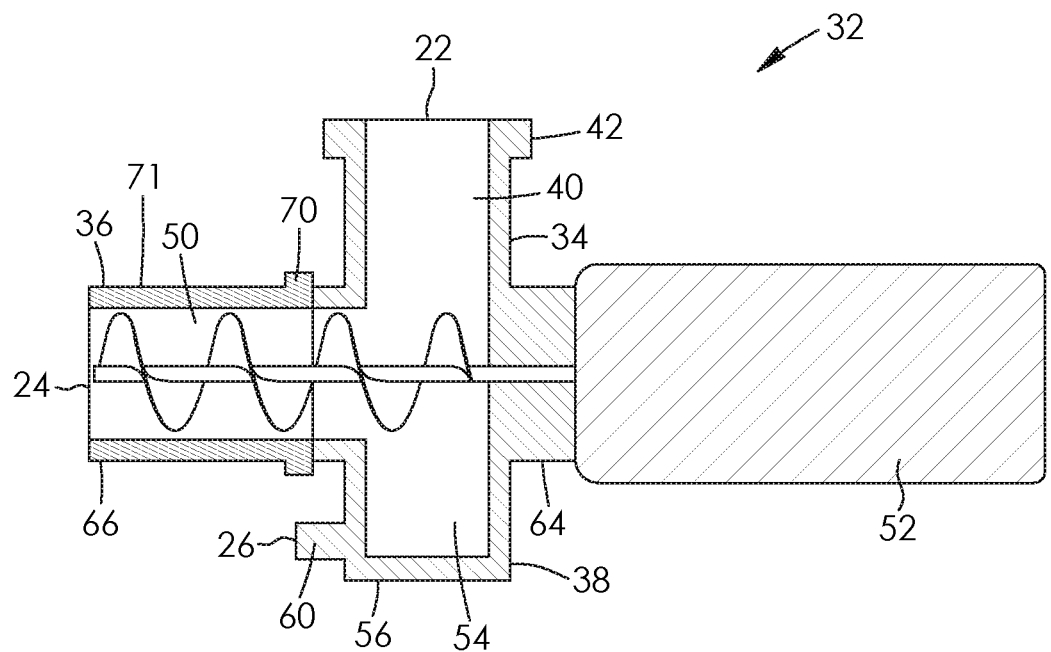
FIG. 3A is a longitudinal sectional view of the waste separator of FIG. 2 taken along line 3A.
Figure 3B:
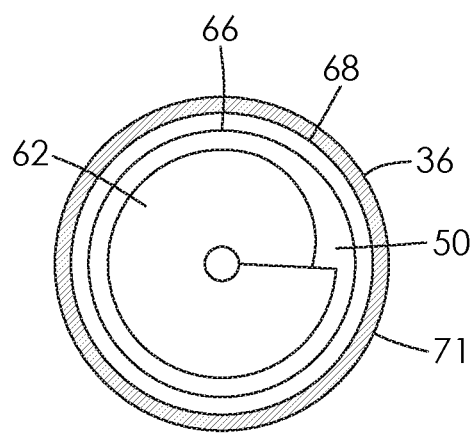
FIG. 3B is a cross sectional view of the waste separator of FIG. 2, taken along line 3B.

As shown in FIG. 2, a housing, generally referred to as 32, includes an upper pipe 34, a transverse pipe 36 and a lower pipe 38. The upper pipe 34 has an upper bore 40 that terminates in the sink waste inlet 22. The sink wastewater inlet 22 is sized to accept the upper section of the sink drain pipe 14 (shown in FIG. 1). A flange 42 encircles the upper pipe 34 at the sink wastewater inlet 22. The dishwasher wastewater inlet 20 enters the upper bore 40 through the sidewall 44. The dishwasher wastewater inlet 20 has a male end 46 for mating with the female end of the dishwasher drain hose. As shown in FIG. 3A, the transverse pipe 36 has a transverse bore 50 that terminates distally at the solid waste outlet 24 and is connected proximally to an electric motor housing 52. The lower pipe 38 has a lower bore 54 that terminates at a closed bottom 56. In an alternative embodiment the lower pipe is bowl-shaped and terminates at the closed bottom 56. The lower pipe and bowl are collectively referred to as a vessel. The drain outlet 26 is normal to the lower pipe 38 and has a drain bore 60 that is of a smaller diameter than the lower bore 54. The drain bore 60 is sized to accept a standard 1.5 inch diameter disposal drain elbow of the drain pipe 14 (shown in FIG. 1). The upper bore 40 and the lower bore 54 are vertically aligned to create a flow-through bore, generally referred to as 55. The flow-through bore 55 allows the filtered water outlet 26 to be gravity fed and reduces entrapment of the liquid waste in the organic solids being separated by the separator. As shown in FIG. 3B, the transverse bore 50 houses an urger 62, which in one embodiment is an auger that is attached to the motor 58 at the proximal end 64 of the transverse pipe 36. The auger 62 is 3 inches in diameter with a 3 inch pitch and is 8 inches long. The auger 62 is a non-cutting auger. This allows the auger to urge the food scraps to the solid waste outlet 24 without creating small particles that could clog the cylindrical filter 67. The cylindrical filter 66 is attached at both the proximal end 64 and the distal end 66 of the transverse pipe 36 and lies between the auger 62 and the inner surface 68 of the transverse pipe 36. As shown in FIGS. 2, and 3A a magnetic flange 70 encircles the transverse pipe sidewall 71.

In another embodiment, the non-cutting auger 62 is replaced with a piston or plunger. As for the auger, the transverse bore 50 houses the piston that is attached to the motor 58 at the proximal end 64 of the transverse pipe 36. The piston is 3 inches in diameter with a 3 inch pitch and is 8 inches long. The piston, as would be known to one skilled int the art, is non-cutting. This allows the piston to urge the food scraps to the solid waste outlet 24 without creating small particles that could clog the cylindrical filter 67. The cylindrical filter 67 is attached at both the proximal end 64 and the distal end 66 of the transverse pipe 36 and lies between the piston and the inner surface 68 of the transverse pipe 36. As shown in FIGS. 2, and 3A a magnetic flange 70 encircles the transverse pipe sidewall 71.

The liquid waste and solid organic waste enter the waste separator 12 through the dishwasher wastewater inlet 20 and the sink wastewater inlet 22. When they reach the transverse pipe 36, the auger 62 drives the organic solid waste towards the solid waste outlet 24 and the liquid waste continues to flow under the force of gravity through the filter 66 to the lower pipe 38 as filtered wastewater. The efficiency of the process is demonstrated in Example 1.

Figure 4:
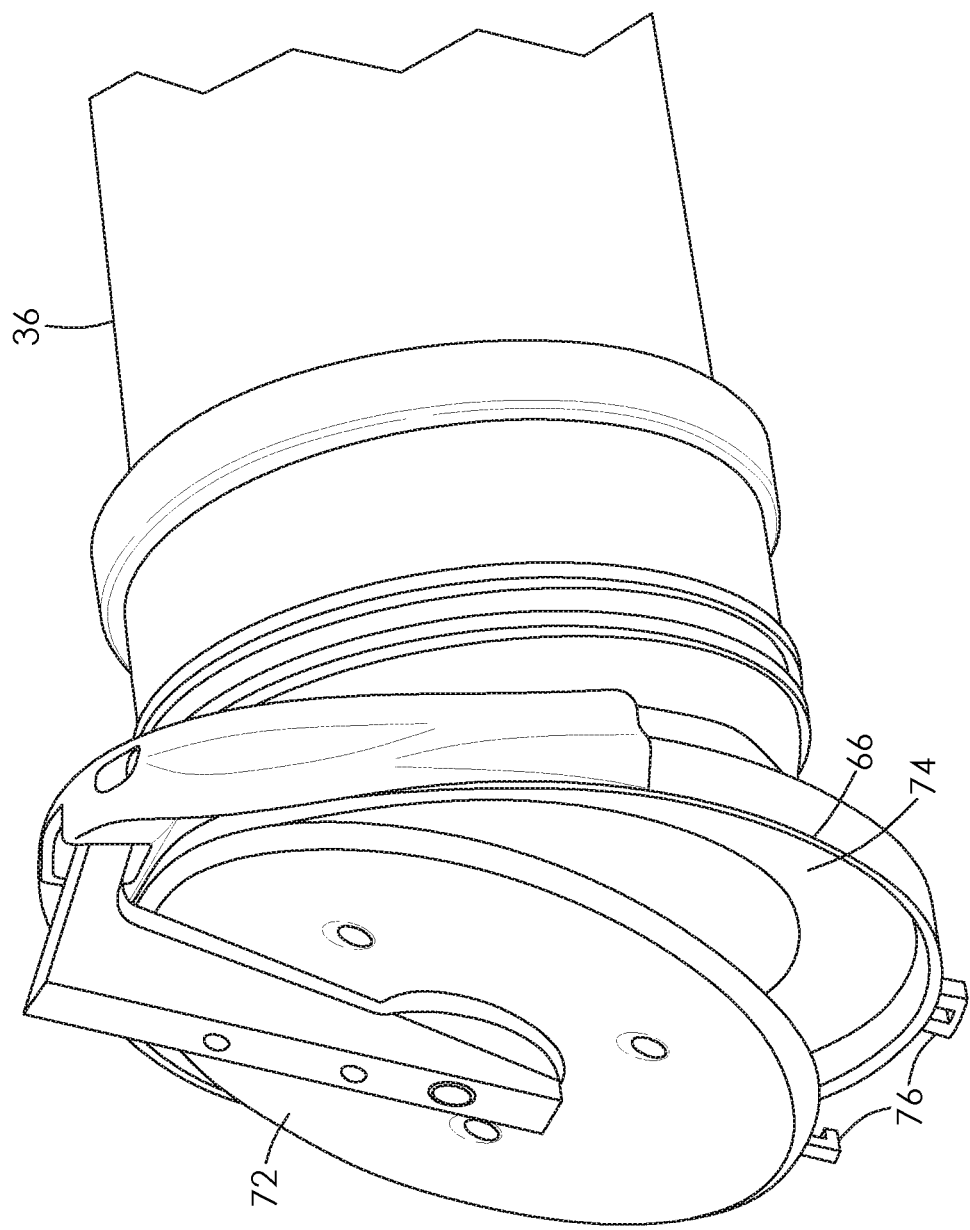
FIG. 4 is a schematic of the distal end of the transverse pipe.

As shown in FIG. 4, the distal end 66 of the transverse pipe 36 has a normally-closed solenoid flap valve 72. A gasket 74 sits between the distal end 66 and the flap valve 72 to ensure that when the flap valve 72 is in the closed position, no water can escape from the separator 12 and no odours can escape from the bin 30. A solenoid hook bolt lock set 76 holds the flap valve 72 in the closed position.

Figure 5:
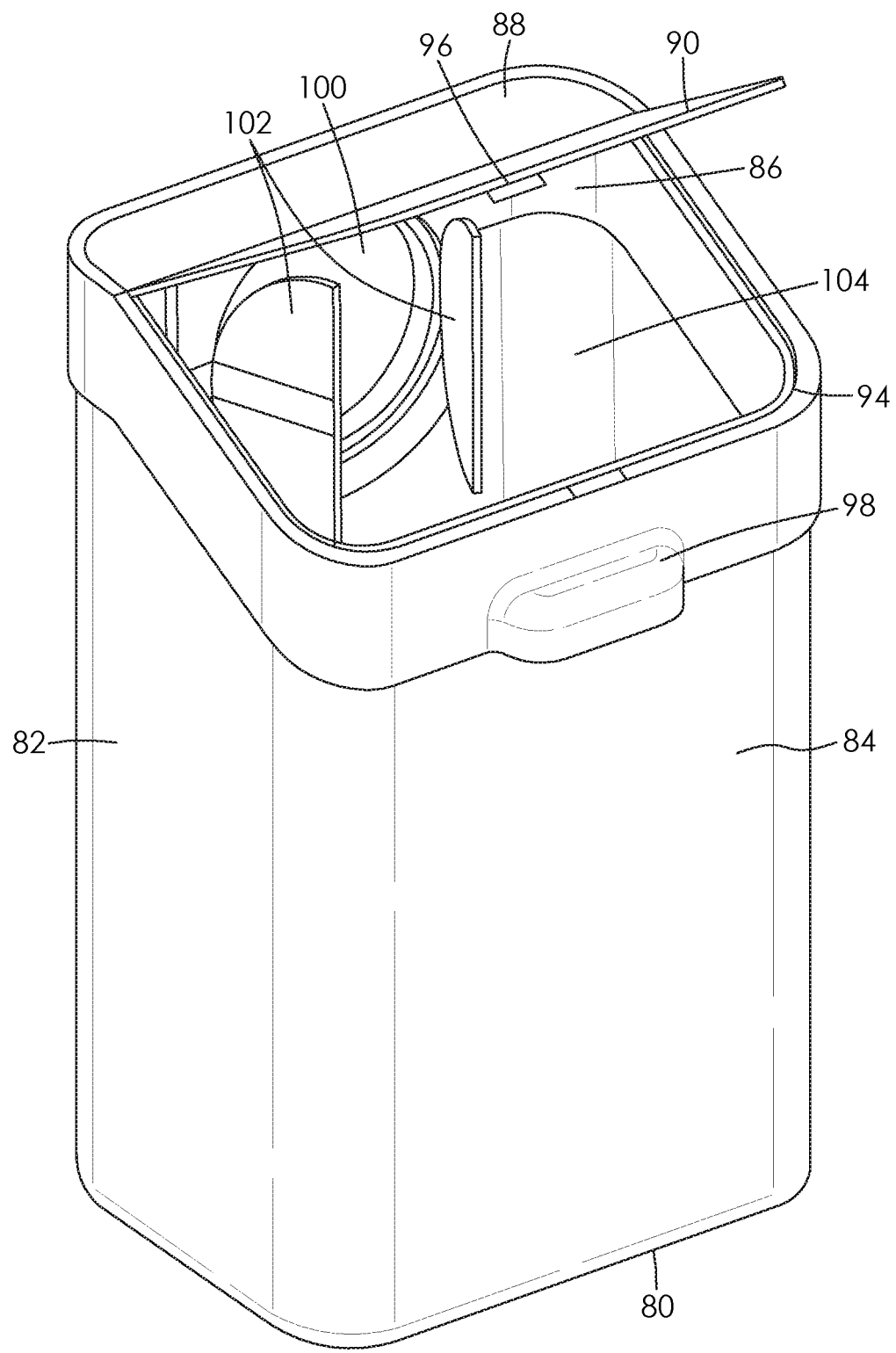
FIG. 5 is a schematic of the bin of the system of FIG. 1.

As shown in FIG. 5, the bin 30 has a bottom 80, sides 82, a front 84, a back 86 and a top 88. At least a part of the top 88 is a lid 90. The lid 90 has a hinge 92 which is either attached to the top 88 or the back 86, preferably the top 88 so the inside of the bin 30 stays as smooth as possible. A gasket 94 reduces or eliminates odours escaping from the bin 30. A latch 96 further reduces or eliminates odours escaping. A handle 98 is located on the front 84. An aperture 100 in the back 86 is sized to accept the solid waste outlet 24. A movable seal, which is preferably a pair of flaps 102 around the aperture 100 reduces or eliminates air movement between the bin interior 104 and the ambient.

Figure 6:
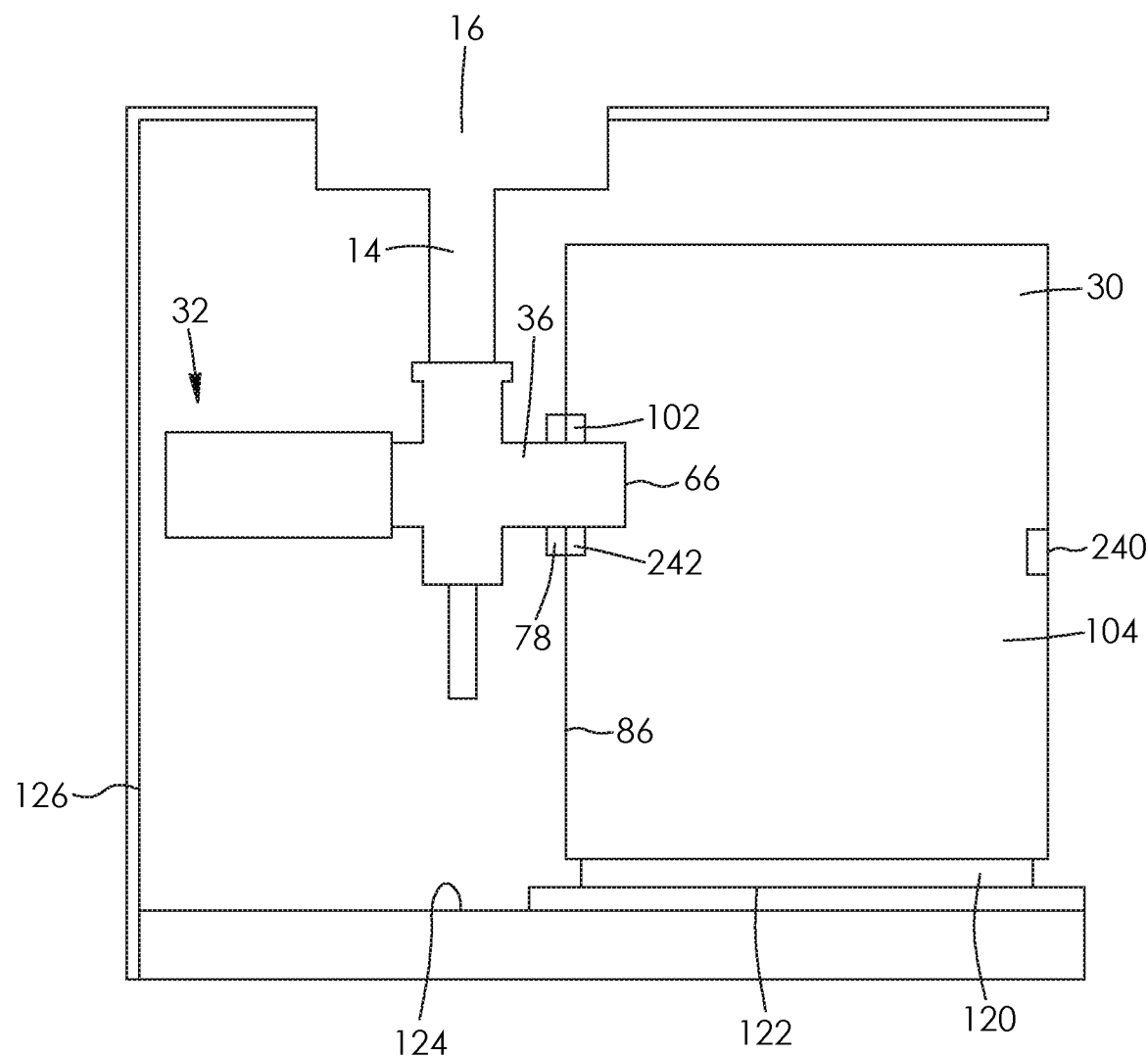
FIG. 6 is a side view of the bin in place on the waste separator in the cabinet.

As shown in FIG. 6, when the bin 30 is in the collecting position, the distal end 66 of the transverse pipe 36 is in the bin interior 104, the flaps 102 are pushed aside and the magnetic flange 78 abuts the back 86, forming a magnetic seal between the back 86 and the flange 78. This magnetic seal further reduces or eliminates odours from escaping and also reduces or eliminates residual water from escaping. The bin 30 has slides 120 on the bottom 80 that run on rails 122 on the mounted on the base 124 of the cabinet 126.

Figure 7:
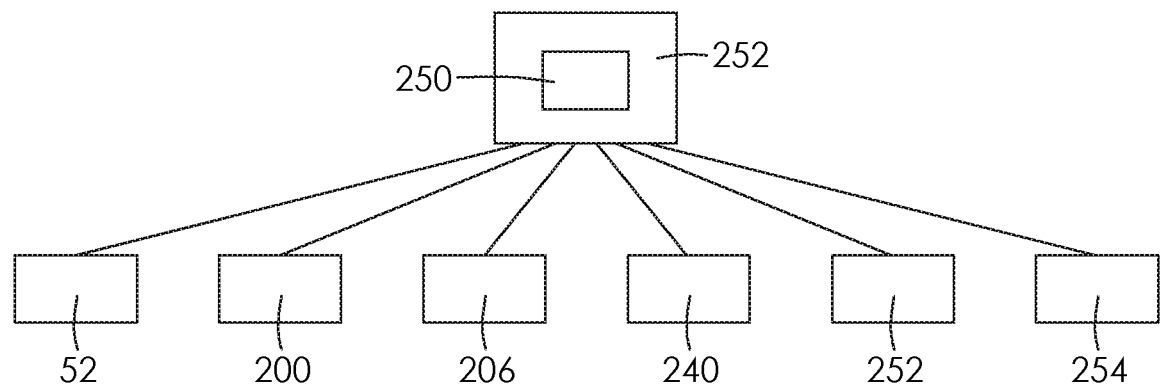
FIG. 7 is a schematic of the electronics of the system.

As shown in FIG. 7, a microprocessor 250 is housed in the motor housing 52. The motor 58, the normally-closed solenoid valve solenoid 200, the hook latch set solenoid 206, a sensor 240, a weigh scale 252 and an alarm 254 are under control of the microprocessor 250 and therefore they are in electrical communication with the microprocessor 250. The microprocessor 250 directs the motor 58 through different cycles other than the primary one of urging the organic waste into the bin 30, for example running backwards to remove a blockage, running at different speeds and stopping. Returning to FIG. 6, the sensor 240 is located in the bin 30 and reports when the bin 30 is full. It may be, for example, but not limited to an optical sensor 240, which is angled downward, in which case a light source would be included 242, or it might be a pressure sensor that senses pressure increases caused by the organic waste pressing against the sensor, or a mechanical switch. The optical sensor 240 is powered by a battery that is housed in a battery housing 256 on the back 86. This results in the microprocessor 250 instructing the alarm 254 to sound. The weigh scale 252 reports the weight of the organic waste.

Figure 8A:
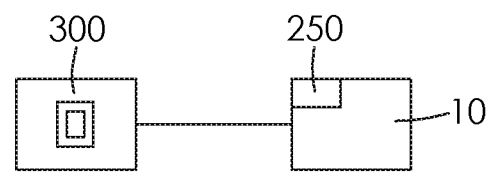
FIG. 8A is a schematic of the microprocessor and switch.
Figure 8B:
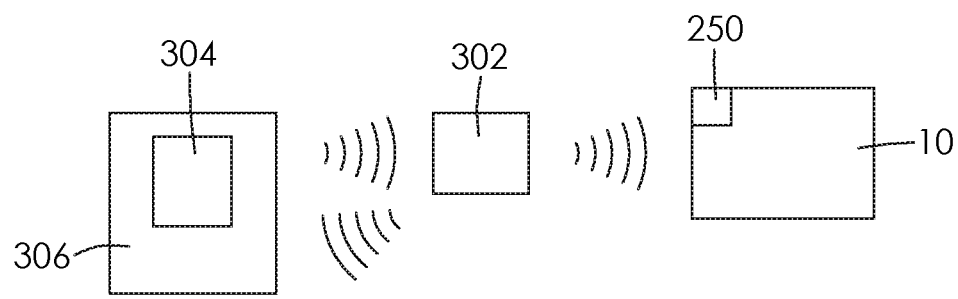
FIG. 8B is a schematic of the microprocessor and a Bluetooth radio.
Figure 8B:
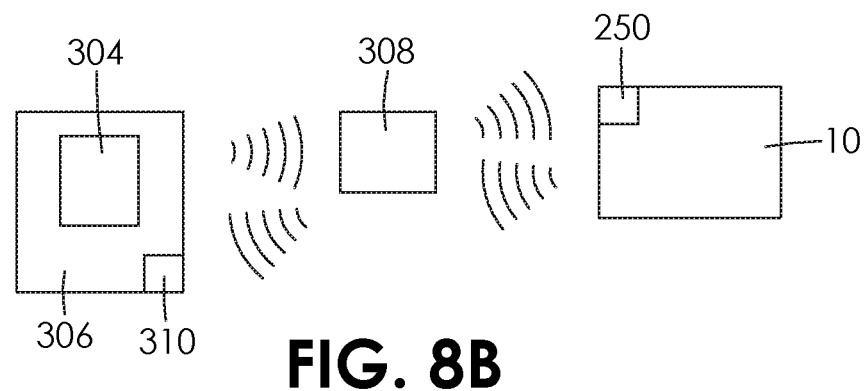

As shown in FIG. 8A, in one embodiment, the waste separator and collector system 10 is wired to a switch 300. In another embodiment shown in FIG. 8B, the microprocessor 250 is hardwired and a Bluetooth® receiver 302 is in electrical communication with the microprocessor 250. A Bluetooth® transceiver 304 in a mobile device 306, for example, but not limited to a cellular phone, a tablet or laptop, is in radio communication with the Bluetooth® receiver 302 and sends instructions to the microprocessor 250. In another embodiment shown in FIG. 8C, there is a Bluetooth transceiver 308 in electrical communication with the microprocessor 250. The transceiver 306 sends organic waste weight data to an application 310 on the mobile device 306 via the Bluetooth transceiver 304. This allows the application 310 to track the amount of waste produced over time.

Example 1

The waste separator and collector system 10 was run and the following data were obtained:

Average food waste extracted: 95%.

Average free liquids removed: 100%.

Longest dimension of solids capable of being processed (not including soft organics e.g. banana peels, which can be much larger): 3 inches.

Filter size (minimum food waste size): 5/32 inch (noting that smaller food particles may be augured by being entrapped within larger particles).

Running time: 6 seconds minimum.

Max power: 200 W.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A waste separator and collector system for use under a sink, the waste separator comprising: a transverse pipe, the transverse pipe including a proximal end, a distal end, a sidewall therebetween, a solid waste outlet at the distal end and a magnetic flange on the exterior surface of the sidewall, the transverse pipe defining a transverse bore, the transverse bore housing a noncutting motor-driven urging mechanism having a moving surface urging solid waste toward the distal end and a cylindrical filter between the non-cutting motor-driven urging mechanism and the transverse pipe sidewall; a sink wastewater inlet in a vicinity of the proximal end, the sink wastewater inlet normal to the transverse bore and in fluid communication with the transverse bore; a normally-closed solenoid valve, the normally-closed solenoid valve in a vicinity of the distal end of the transverse pipe; a lower vessel, the lower vessel including a waste water outlet, the lower vessel defining an interior, the interior in fluid communication with the transverse bore proximate the proximal end; and a microprocessor, the microprocessor in electronic communication with the normally-closed solenoid valve, and the collector comprising: a front; a back; the back defining an aperture; a movable seal which can cover the aperture; sides; a top, the top including a lid; and a bottom, to define an interior, at least the distal end of the transverse pipe extending into the interior through the aperture and movable seal such that the magnetic flange abuts the back of the collector surrounding the aperture and magnetically, releasably seals the transverse pipe to the back.

2. The system of claim 1, wherein the waste separator further comprises an upper pipe, the upper pipe disposed between the sink wastewater inlet and the transverse pipe, the upper pipe defining an upper bore, the upper bore in fluid communication with the sink wastewater inlet and the transverse bore.

3. The system of claim 2, wherein the movable seal is a pair of flaps that cover the aperture.

4. The system of claim 3, wherein system includes an alarm and the collector includes a sensor which senses when the collector is full, the alarm and the sensor in electronic communication with the microprocessor.

5. The system of claim 4 wherein the waste separator further comprises a solenoid latch set on the normally-closed solenoid valve and the distal end, the solenoid latch set in electronic communication with the microprocessor.

6. The system of claim 5, wherein the waste separator further comprises a gasket between the distal end and the normally-closed solenoid flap valve.

7. The system of claim 6, further comprising a wireless transceiver in electronic communication with the microprocessor.

8. The system of claim 7 further comprising a computing device, the computing device in radio communication with the wireless transceiver.

9. The system of claim 8, further comprising an application on the computing device and a weigh scale in the collector, the weigh scale in electronic communication with the wireless transceiver, the application for tracking a weight of organic waste.

10. The system of claim 9, wherein the computing device is a handheld, mobile device.

11. The system of claim 10, wherein the non-cutting, motor-driven urging mechanism is a non-cutting, motor-driven auger.

12. The system of claim 10, wherein the non-cutting, motor driven urging mechanism is a piston.

\* \* \* \* \*